(12) United States Patent
Taguchi (10) Patent No.: US 8,532,907 B2
(45) Date of Patent: Sep. 10, 2013

(54) CRUISE CONTROL SYSTEM AND CRUISE CONTROL METHOD

(75) Inventor: Koji Taguchi, Isehara (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1128 days.

(21) Appl. No.: 12/430,569

(22) Filed: Apr. 27, 2009

(65) Prior Publication Data

US 2009/0271084 A1 Oct. 29, 2009

(30) Foreign Application Priority Data

Apr. 28, 2008 (JP) ................ 2008-117454

(51) Int. Cl.
*B60W 30/16* (2006.01)

(52) U.S. Cl.
CPC ................... *B60W 30/16* (2013.01)
USPC ................................................. 701/96

(58) Field of Classification Search
USPC ................................................. 701/96
See application file for complete search history.

(56) References Cited

U.S. PATENT DOCUMENTS

| | | | | |
|---|---|---|---|---|
| 3,582,876 A | * | 6/1971 | Carmack et al. | 340/920 |
| 5,572,449 A | * | 11/1996 | Tang et al. | 700/304 |
| 5,901,806 A | * | 5/1999 | Takahashi | 180/170 |
| 6,320,515 B1 | * | 11/2001 | Olsson | 340/905 |
| 6,497,297 B1 | * | 12/2002 | Ebert et al. | 180/170 |
| 6,580,996 B1 | * | 6/2003 | Friedrich | 701/96 |
| 2005/0055150 A1 | * | 3/2005 | Uhler et al. | 701/93 |
| 2006/0009910 A1 | * | 1/2006 | Ewerhart et al. | 701/301 |
| 2006/0229793 A1 | * | 10/2006 | Sawamoto et al. | 701/96 |
| 2007/0150167 A1 | * | 6/2007 | Kerner | 701/117 |

FOREIGN PATENT DOCUMENTS

| | | | |
|---|---|---|---|
| JP | 04244434 A | * | 9/1992 |
| JP | 6-191319 | | 7/1994 |
| JP | 10-318009 | | 12/1998 |
| JP | 2001-26226 | | 1/2001 |
| JP | 2002-120594 | | 4/2002 |
| JP | 2006-232240 | | 9/2006 |
| JP | 2006-309736 | | 11/2006 |
| JP | 2007-58631 | | 3/2007 |
| JP | 2007-179166 | | 7/2007 |

OTHER PUBLICATIONS

Office Action dated Dec. 8, 2009, in Japanese Patent Application No. 2008-117454, filed Apr. 28, 2008 (with English-language Translation).

Office Action dated Jun. 28, 2010, in Japanese Patent Application No. 2008-117454, filed Apr. 28, 2008 (with English-language Translation).

Office Action dated Oct. 25, 2010, in Japanese Patent Application No. 2008-117454, filed Apr. 28, 2008 (with English-language Translation).

\* cited by examiner

*Primary Examiner* — Shelley Chen

(74) *Attorney, Agent, or Firm* — Oblon, Spivak, McClelland, Maier & Neustadt, L.L.P.

(57) ABSTRACT

A cruise control system includes: a traffic condition acquisition unit that acquires a traffic condition that includes a vehicle density on a road on which a vehicle runs; and a cruise control unit that performs cruise control on the vehicle so that a following distance has a less tendency to decrease as the road gets busier.

20 Claims, 6 Drawing Sheets

CRUISE CONTROL SYSTEM AND CRUISE CONTROL METHOD

INCORPORATION BY REFERENCE

The disclosure of Japanese Patent Application No. 2008-117454 filed on Apr. 28, 2008 including the specification, drawings and abstract is incorporated herein by reference in its entirety.

BACKGROUND OF THE INVENTION

1. Field of the Invention

The invention relates to a cruise control system and cruise control method that perform cruise control on a vehicle.

2. Description of the Related Art

For example, Japanese Patent Application Publication No. 2001-26226 (JP-A-2001-26226) describes a known vehicle cruise control system that performs cruise control on a vehicle. The cruise control system of a vehicle that follows the vehicle ahead appropriately selects and performs cruise control based on an acceleration or cruise control based on a following distance on the basis of a vehicle speed. The cruise control system attempts to further quickly track the vehicle ahead through cruise control based on an acceleration when the vehicle ahead accelerates in a low-speed state, such as when a road is busy.

However, in the above described vehicle cruise control technique, there is a problem that spontaneous traffic congestion is prone to occur when the amount of traffic on a road increases. For example, while acceleration control or following distance control is being carried out as cruise control, as the amount of traffic of vehicles on a road increases, the speed of the vehicles decreases, so a distance between adjacent vehicles reduces accordingly. Then, as a vehicle brakes with a reduced following distance, the braking operation of the vehicle causes a following vehicle to further strongly brake. Thus, a deceleration due to the braking operation propagates backward while being amplified, thus causing a massive spontaneous traffic congestion.

SUMMARY OF THE INVENTION

The invention provides a cruise control system and cruise control method that are able to suppress or prevent occurrence of a traffic congestion.

According to an embodiment of the invention, a cruise control system includes: a traffic condition acquisition unit that acquires a traffic condition that includes a vehicle density on a road on which a vehicle runs; and a cruise control unit that performs cruise control on the vehicle so that a following distance has a less tendency to decrease as the vehicle density on the road increases toward a critical density.

With the above embodiment, by performing cruise control so that a following distance has a less tendency to decrease as the vehicle density on a road increases toward a critical density, the following distance is not excessively decreased even when the vehicle density increases and, therefore, it is likely to cause a spontaneous traffic congestion. In addition, a braking operation hardly propagates to a following vehicle. Thus, it is possible to suppress or prevent a congested traffic flow.

In the cruise control system according to the above embodiment, the cruise control unit may control the following distance to the vehicle ahead, and may increase a feedback gain for determining the following distance as the vehicle density increases toward the critical density.

In the cruise control system according to the above embodiment, the cruise control unit may perform cruise control such that a target following distance is set so that the vehicle density is smaller than or equal to the critical density.

With the above embodiment, cruise control is performed by setting a target following distance such that the vehicle density is smaller than or equal to the critical density. Thus, even when the vehicle density increases and, therefore, it is likely to cause a spontaneous traffic congestion, it is possible to prevent a following distance from being excessively decreased. Thus, a braking operation of a vehicle hardly propagates to a following vehicle, so it is possible to suppress or prevent a congested traffic flow. In addition, when the traffic flow is a congested traffic flow, the vehicle is driven to keep a following distance so that the vehicle density is smaller than or equal to the critical density. Thus, the vehicle may accelerate immediately in response to acceleration of the vehicle ahead, so it is possible to early eliminate the traffic congestion.

In the cruise control system according to the above embodiment, if the vehicle density is larger than the critical density and the traffic condition is a congested traffic flow, the cruise control unit may increase a target following distance as compared with an average following distance in the congested traffic flow.

With the above embodiment, if the vehicle density is larger than the critical density and, as a result, the traffic condition is a congested traffic flow, by increasing a target following distance as compared with an average following distance in the congested traffic flow, the following distance is relatively increased. Thus, the vehicle may accelerate immediately in response to acceleration of the vehicle ahead, so it is possible to early eliminate the traffic congestion.

In the cruise control system according to the above embodiment, the cruise control system may further include a road information acquisition unit that acquires information of a running section which causes a change in speed of a vehicle on the road, wherein the cruise control unit may increase a target following distance in the running section as compared with a target following distance in a section other than the running section.

With the above embodiment, by relatively increasing a target following distance in a running section which causes a change in speed of a vehicle on the road, a following distance is increased in a section in which the vehicle density tends to increase. Thus, it is possible to suppress or prevent occurrence of a traffic congestion.

In the cruise control system according to the above embodiment, the cruise control unit may set the target following distance in the running section to a distance such that the vehicle density is smaller than or equal to the critical density.

In the cruise control system according to the above embodiment, the traffic condition acquisition unit may cause a host vehicle to make a lane change when the host vehicle is running on a road having a plurality of lanes, may acquire the vehicle density and a traffic flow rate after the lane change, and may calculate the critical density on that road.

With the above embodiment, while the host vehicle is running on a road having a plurality of lanes, the host vehicle is caused to make a lane change, the vehicle density and the traffic flow rate after the lane change are acquired, and the critical density on that road is calculated. Thus, it is possible to acquire accurate critical density data on that road.

In the cruise control system according to the above embodiment, the cruise control unit may instruct a driver of the vehicle not to decrease a following distance.

According to another embodiment of the invention, a cruise control method includes: acquiring a traffic condition that includes a vehicle density on a road on which a vehicle runs; and performing cruise control on the vehicle so that a following distance has a less tendency to decrease as the vehicle density on the road increases toward a critical density.

With the cruise control method according to the above embodiment, by performing cruise control so that a following distance has a less tendency to decrease as the vehicle density on a road increases toward the critical density, the following distance is not excessively decreased even when the vehicle density increases and, therefore, it is likely to cause a spontaneous traffic congestion. In addition, a braking operation hardly propagates to a following vehicle. Thus, it is possible to suppress or prevent a congested traffic flow.

In the cruise control method according to the above embodiment, the cruise control may control a following distance to the vehicle ahead, and may increase a feedback gain for determining the following distance as the vehicle density increases toward the critical density.

In the cruise control method according to the above embodiment, a target following distance may be set so that the vehicle density is smaller than or equal to the critical density.

According to the embodiments of the invention, cruise control is performed by setting a target following distance such that the vehicle density is smaller than or equal to the critical density. Thus, even when the vehicle density increases and, therefore, it is likely to cause a spontaneous traffic congestion, it is possible to prevent a following distance from being excessively decreased. Thus, a braking operation of a vehicle hardly propagates to a following vehicle, so it is possible to suppress or prevent a congested traffic flow. In addition, when the traffic flow is a congested traffic flow, the vehicle is driven to keep a following distance so that the vehicle density is smaller than or equal to the critical density. Thus, the vehicle may accelerate immediately in response to acceleration of the vehicle ahead, so it is possible to early eliminate the traffic congestion.

In addition, by performing cruise control so that the following distance does not excessively decrease, it is possible to suppress or prevent occurrence of a traffic congestion.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings. Note that in the description of the drawings, like reference numerals denote like components, and the overlap description is omitted.

Figure 1:
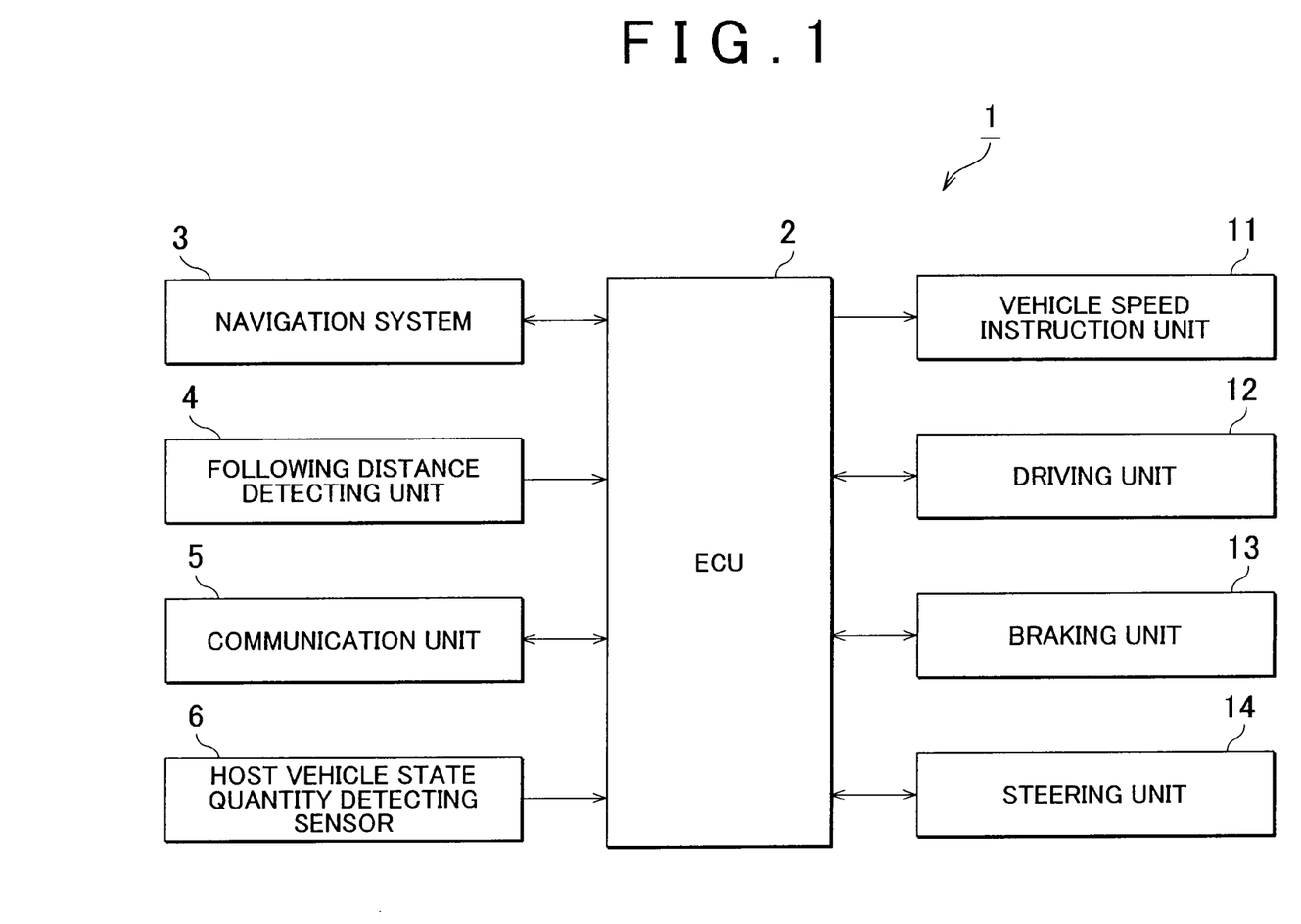
FIG. 1 is a schematic configuration diagram of a cruise control system according to an embodiment of the invention.

FIG. 1 is a schematic configuration diagram of a cruise control system according to an embodiment of the invention.

As shown in FIG. 1, the cruise control system 1 according to the present embodiment performs cruise control on a vehicle, and is mounted on the vehicle. The cruise control system 1 includes an electronic control unit (ECU) 2, a navigation system 3, a following distance detecting unit 4, a communication unit 5, and a host vehicle state quantity detecting sensor 6.

The ECU 2 controls the overall cruise control system 1. The ECU 2 is, for example, mainly formed of a computer that includes a central processing unit (CPU), a read only memory (ROM) and a random access memory (RAM). The ECU 2 functions as a cruise control unit. The cruise control unit acquires a traffic condition that includes a vehicle density on a road on which the vehicle runs, and performs cruise control on the vehicle so that a following distance has a less tendency to decrease as the vehicle density on the road increases toward a critical density.

In addition, the ECU 2 functions as a cruise control unit that performs cruise control such that a target following distance is set so that a vehicle density is smaller than or equal to a critical density. Here, the critical density means the vehicle density at which the traffic flow on a road changes from a free traffic flow (a natural traffic flow) into a congested traffic flow.

Figure 2:
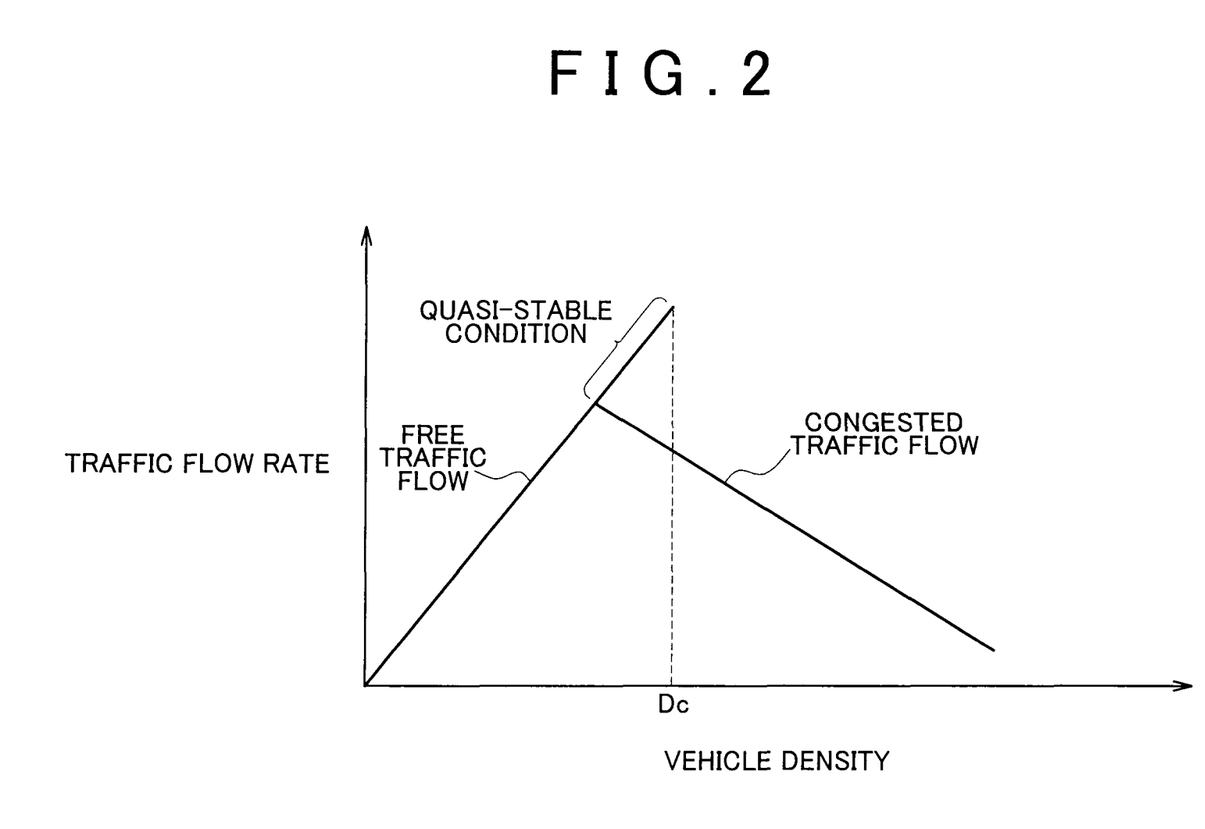
FIG. 2 is a graph that illustrates a traffic flow on a road.

For example, as shown in FIG. 2, when the number of vehicles is small on a road and, therefore, the vehicle density is small, the traffic flow is a free traffic flow. Thus, vehicles may run at a constant speed, such as a legal speed, so the traffic flow rate increases with an increase in vehicle density. Then, as the vehicle density increases, a distance between adjacent vehicles decreases. Thus, the traffic flow rate not increases but decreases with an increase in vehicle density, so the traffic flow is a congested traffic flow. At this time, the vehicle density at which the traffic flow changes from a free traffic flow into a congested traffic flow is a critical density Dc. In addition, there is a state where the traffic flow rate may increase with an increase in vehicle density or the traffic flow may be a congested traffic flow. This is called a quasi-stable condition. Note that the solid line segments (free traffic flow, quasi-stable condition, congested traffic flow) in FIG. 2 represent states of the traffic flow that frequently occurs, and the traffic flow may deviate from the solid line segments depending on a traffic situation, or the like.

The critical density is, for example, a vehicle density of 20 to 30 vehicles per kilometer on a road, and then a distance between adjacent vehicles is about 30 to 50 meters. The critical density varies depending on the number of lanes or shape of a road, the types or performances of vehicles, traffic rules, or the like. Thus, the critical density may be set for each of running locations, seasons, weekdays, and times. Then, for setting a target following distance in accordance with the critical density, the target following distance may be set for each of running locations, seasons, weekdays, and times. At this time, the critical density or the target following distance may be set for each of completely different combinations of a running location, a season, a weekday and a time, or the critical density or the target following distance may be set for each of partially different combinations of a running location, a season, a weekday and a time.

The navigation system 3 functions as a host vehicle location detecting unit. The navigation system 3, for example, has a global positioning system (GPS) function and a map database that contains road information.

The following distance detecting unit 4 functions as a following distance detecting unit that detects a following distance to the vehicle ahead. The following distance detecting unit 4 is, for example, a millimeter wave radar-type or laser radar-type distance detector. The following distance detecting unit 4 is provided at the front of the vehicle, and is able to transmit millimeter waves or laser ahead of the vehicle.

The communication unit 5 functions as a vehicle location acquisition unit that acquires location information of a surrounding vehicle through communication. The communication unit 5 is, for example, an inter-vehicle communication equipment, a road-to-vehicle communication equipment (infrastructure communication equipment), or the like. The communication unit 5 is only required to be able to acquire location information of a surrounding vehicle through communication. Any communication mode, any communication medium, and the like, may be used in the communication unit 5.

The host vehicle state quantity detecting sensor 6 detects vehicle speed information, or the like, of a host vehicle. The host vehicle state quantity detecting sensor 6 is, for example, a wheel speed sensor. The vehicle speed information may be acquired by the wheel speed sensor.

The cruise control system 1 includes a vehicle speed instruction unit 11, a driving unit 12, a braking unit 13, and a steering unit 14. These vehicle speed instruction unit 11, driving unit 12, braking unit 13 and steering unit 14 perform cruise control.

The vehicle speed instruction unit 11 instructs a driver of the host vehicle to change the vehicle speed. The vehicle speed instruction unit 11 is, for example, a speaker or a buzzer that instructs the driver to change the vehicle speed through the sense of hearing, a monitor or a light emitting element, such as a lamp, that instructs the driver to change the vehicle speed through the sense of sight, or the like. The vehicle speed instruction unit 11 operates in accordance with a control signal from the ECU 2. The vehicle speed instruction unit 11, for example, instructs the driver to decrease the vehicle speed in order to maintain a following distance such that the vehicle density is a critical density.

The driving unit 12 functions as a driving unit that drives the vehicle. The driving unit 12 is, for example, formed of an engine ECU, a throttle motor, an injector, and the like. The driving unit 12 operates as it receives a driving signal from the ECU 2, and drives the vehicle in accordance with the driving signal.

The braking unit 13 functions as a braking unit that brakes the vehicle. The braking unit 13 is, for example, formed of a brake ECU, an electromagnetic valve that adjusts a brake hydraulic pressure, and a pump motor that generates a brake hydraulic pressure. The braking unit 13 operates as it receives a braking instruction signal from the ECU 2, and brakes the vehicle in accordance with the braking instruction signal.

The steering unit 14 functions as a steering unit that steers the vehicle. The steering unit 14 is, for example, formed of a steering ECU and an electric motor of an electric power steering system. The steering unit 14 operates as it receives a steering instruction signal from the ECU 2, and controls steering in accordance with the steering instruction signal. Note that when the vehicle has no automatic driving function for steering, installation of the steering unit 14 may be omitted.

The vehicle speed instruction unit 11 performs cruise control through drive assist. The driving unit 12, the braking unit 13 and the steering unit 14 perform cruise control through control intervention. Note that when the cruise control system 1 performs cruise control only through drive assist, installation of the driving unit 12, braking unit 13 and steering unit 14 may be omitted. On the other hand, when the cruise control system 1 performs cruise control only through control intervention, installation of the vehicle speed instruction unit 11 may be omitted.

Next, the operation of the cruise control system according to the present embodiment and a cruise control method according to the present embodiment will be described.

Figure 3:
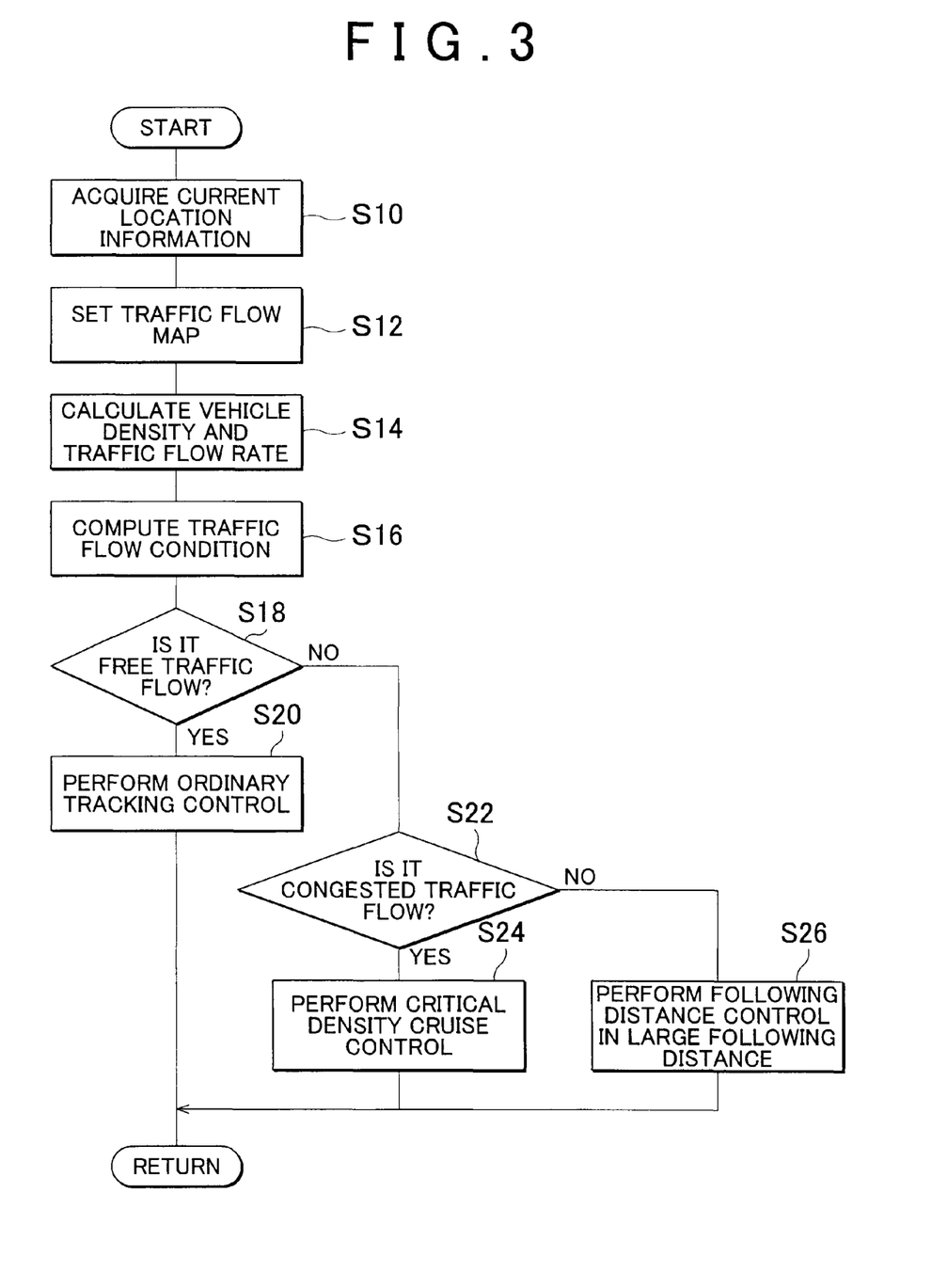
FIG. 3 is a flowchart that shows the basic operation of the cruise control system shown in FIG. 1.

FIG. 3 is a flowchart that shows the basic operation of the cruise control system according to the present embodiment and the cruise control method according to the present embodiment. The control process shown in FIG. 3 is, for example, repeatedly executed by the ECU 2 at predetermined intervals.

First, as shown in FIG. 3, in S10, current location information of a host vehicle is acquired. This process acquires current running location information of the host vehicle, and, for example, acquires the information by reading location information detected by the navigation system 3. Then, in S12, a traffic flow map is set. This process sets a traffic flow map for computing the condition of a traffic flow by referring to the relationship between a vehicle density and a traffic flow rate on the basis of the current location information.

For example, when a traffic flow map at the current location of the host vehicle is entered in the ECU 2 in advance, that traffic flow map is set. On the other hand, when no traffic flow map at the current location of the host vehicle is entered in the ECU 2 in advance, a standard traffic flow map is set. The traffic flow map, for example, allows determination on the basis of a vehicle density and a traffic flow rate whether the condition of a traffic flow is a free traffic flow, a quasi-stable condition or a congested traffic flow, as shown in FIG. 2.

Then, in S14, the vehicle density and the traffic flow rate are calculated. This process calculates the vehicle density and the traffic flow rate on the road on which the host vehicle runs. For example, the vehicle density is calculated on the basis of location information of another vehicle, which is acquired through inter-vehicle communication or road-to-vehicle communication. In addition, when the information of the vehicle density is acquired through communication, that vehicle density may be used. The traffic flow rate is calculated by multiplying the vehicle density by a running speed. In addition, when the information of the traffic flow rate is acquired through communication, that traffic flow rate may be used.

Then, in S16, the condition of a traffic flow is computed. This process computes the current condition of a traffic flow on the road on which the host vehicle runs. For example, the traffic flow map set in S12 is used to compute the current condition of a traffic flow, that is, a free traffic flow, a quasi-stable condition or a congested traffic flow, on the basis of the vehicle density and traffic flow rate calculated in S14.

Then, in S16, it is determined whether the traffic flow is a free traffic flow. When it is determined in S16 that the traffic flow is a free traffic flow, ordinary tracking control is performed (S20). For example, tracking control is performed so as to attain a predetermined following time to the vehicle ahead of the host vehicle, that is, tracking control is performed to maintain a constant following time. Then, when feedback control is performed in order to maintain a following distance, it is not necessary to set a large feedback gain to strictly maintain a following distance. Thus, it is possible to suppress deterioration of fuel economy and deterioration of ride comfort.

On the other hand, when it is determined in S16 that the traffic flow is not a free traffic flow, it is determined whether the traffic flow is a congested traffic flow (S22). When it is determined in S22 that the traffic flow is a congested traffic flow, critical density cruise control is performed (S24). The critical density cruise control is a following distance control such that the vehicle is driven to keep a following distance to the vehicle ahead so that the vehicle density is basically smaller than or equal to the critical density. For example, a target following distance is set so that the vehicle density is the critical density, and cruise control is performed to attain the target following distance. In this case, because a sufficiently long following distance is set, a traffic congestion is eliminated. In addition, the vehicle may immediately accelerate when the vehicle ahead accelerates, so it is possible to early eliminate a traffic congestion.

In addition, when the traffic flow is a congested traffic flow, the target following distance may be increased as compared with an average following distance in the congested traffic flow, and cruise control may be performed to attain the target following distance. In this case as well, because a following distance is increased as compared with a following distance during an ordinary traffic congestion, a traffic congestion is eliminated. In addition, the host vehicle is able to early accelerate when the vehicle ahead accelerates, so it is possible to early eliminate a traffic congestion. In addition, because a following distance is decreased as compared with a following distance at the time when the vehicle density is the critical density, it is possible to suppress interruption of a vehicle from an adjacent lane.

On the other hand, when it is determined in S22 that the traffic flow is not a congested traffic flow, it is determined that the traffic flow is a quasi-stable condition, and following distance control in which a following distance is relatively increased is performed (S26). This following distance control process performs cruise control on the vehicle so that a following distance has a less tendency to decrease as the vehicle density on the road increases toward the critical density. For example, when cruise control is performed through control intervention, the following distance control process is set so that a target following distance has a less tendency to decrease as the vehicle density increases toward the critical density. In addition, when cruise control is performed through drive assist, it is only necessary that the number of times the driver is instructed to decrease the vehicle speed is increased as the vehicle density increases toward the critical density.

At this time, it is desirable that a feedback gain that determines a following distance is increased as the vehicle density increases toward the critical density. In this case, it is possible to prevent a situation that a following distance to the vehicle ahead is strictly maintained at a target following distance and, therefore, the following distance is excessively decreased momentarily.

In addition, in the following distance control, it is desirable to perform cruise control such that a target following distance is set so that the vehicle density is smaller than or equal to the critical density. In this case, even when the vehicle density increases and, therefore, it is likely to cause a spontaneous traffic congestion, it is possible to prevent a following distance from being excessively decreased. Thus, a braking operation of a vehicle hardly propagates to a following vehicle, so it is possible to suppress or prevent a congested traffic flow. When the process in S26 ends, a series of cruise control process ends.

According to the above cruise control process, by performing cruise control so that a following distance has a less tendency to decrease as the vehicle density on a road increases toward the critical density, the following distance is not excessively decreased even when the vehicle density increases and, therefore, it is likely to cause a spontaneous traffic congestion. In addition, a braking operation hardly propagates to a following vehicle. Thus, it is possible to suppress or prevent a congested traffic flow.

In addition, cruise control is performed by setting a target following distance such that the vehicle density is smaller than or equal to the critical density. Thus, even when the vehicle density increases and, therefore, it is likely to cause a spontaneous traffic congestion, it is possible to prevent a following distance from being excessively decreased. Hence, a braking operation of a vehicle hardly propagates to a following vehicle, so it is possible to suppress or prevent a congested traffic flow. In addition, when the traffic flow is a congested traffic flow, the vehicle is driven to keep a following distance so that the vehicle density is smaller than or equal to the critical density. Thus, the vehicle may accelerate immediately in response to acceleration of the vehicle ahead, so it is possible to early eliminate the traffic congestion.

In addition, when the vehicle density is larger than the critical density and, as a result, the traffic condition is a congested traffic flow, by increasing a target following distance as compared with an average following distance in the congested traffic flow, the following distance is relatively increased. Thus, the vehicle may accelerate immediately in response to acceleration of the vehicle ahead, so it is possible to early eliminate the traffic congestion.

Figure 4:
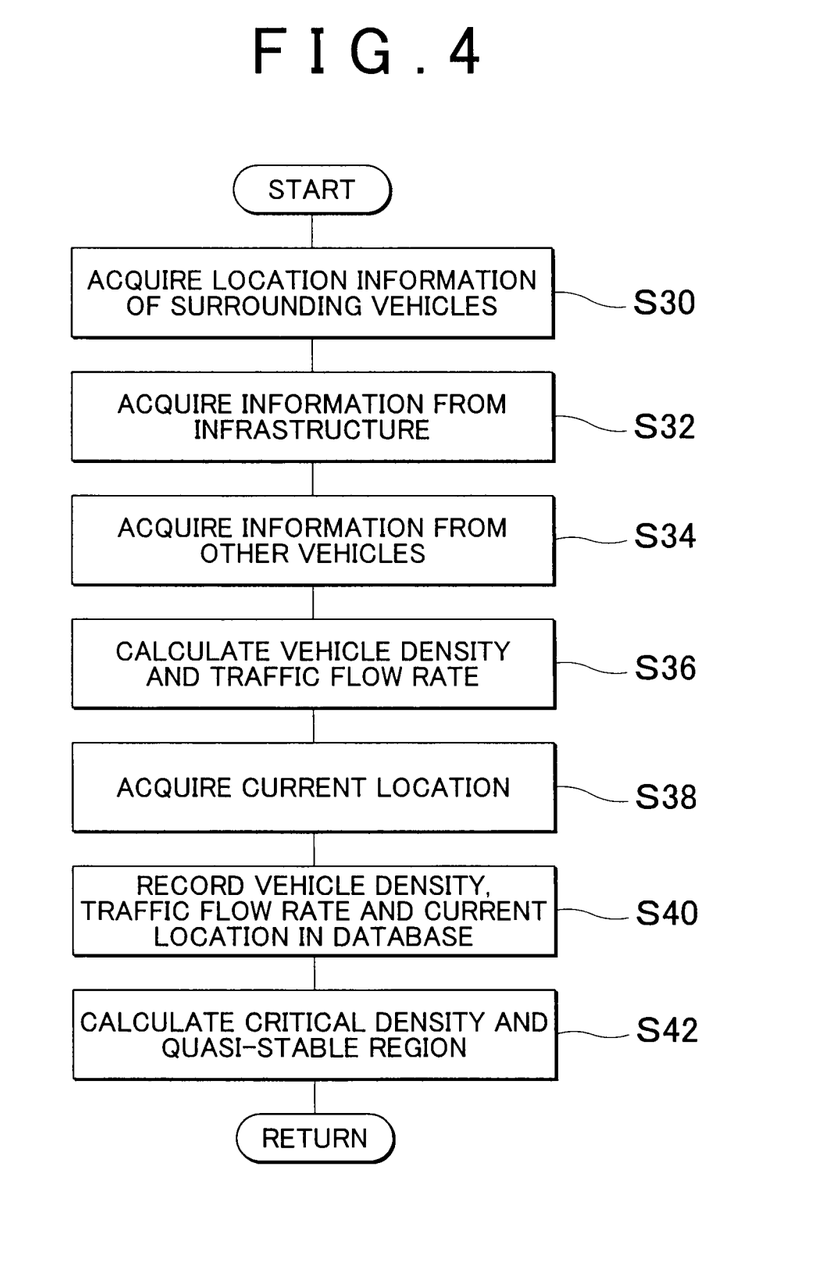
FIG. 4 is a flowchart that shows a traffic flow data recording process executed in the cruise control system shown in FIG. 1.

FIG. 4 is a flowchart that shows a traffic flow data recording process executed in the cruise control system according to the present embodiment.

The traffic flow data recording process shown in FIG. 4 calculates a vehicle density and a traffic flow rate on a road on which a vehicle actually runs, detects the condition of a traffic flow and then records the traffic flow map in a database. The traffic flow data recording process is, for example, repeatedly executed by the ECU 2 at predetermined intervals.

First, as shown in FIG. 4, in S30, surrounding vehicle location information is acquired. This process acquires location information of another vehicle that runs around the host vehicle, and is performed so that locations of vehicles ahead and behind the host vehicle and a location of a vehicle in an adjacent lane are, for example, detected by a surrounding monitoring sensor, such as a camera or a radar, mounted on the host vehicle.

Then, in S32, information is acquired from an infrastructure. This process acquires detected information of vehicles that run on the road through vehicle-to-road communication with the infrastructure or acquires vehicle density information based on the detected information, and acquires information through the communication unit 5. Note that, when the communication unit 5 has no vehicle-to-road communication function, the process in S32 may be omitted. Then, in S34, information is acquired from another vehicle. This process acquires information about vehicles that run on the road or vehicle density information based on that information through inter-vehicle communication with another vehicle, and the information is acquired through the communication unit 5. Note that, when the communication unit 5 has no inter-vehicle communication function, the process in S34 may be omitted.

Then, in S36, a vehicle density and a traffic flow rate are calculated. This process calculates a current vehicle density and a current traffic flow rate on the road on which the host vehicle runs. For example, a current vehicle density on the road is calculated on the basis of the vehicle location information acquired through the processes in S30 to S34, and a current traffic flow rate on the road is calculated by multiplying the calculated vehicle density by an average vehicle speed.

Then, in S38, current location information is acquired. This process acquires current location information of the host vehicle, and, for example, the location of the host vehicle is acquired on the basis of a signal detected by the navigation system 3. Then, in S40, the vehicle density and traffic flow rate calculated in S36 and the location information acquired in S38 are associated with each other and recorded in a database.

Then, in S42, the traffic flow is derived. This process uses the vehicle density and traffic flow rate calculated in S36 to derive the traffic flow, such as a critical density and a quasi-stable condition region, on that road. For example, through typical statistical process in jammology, or the like, a map, or the like, that represents the condition of a traffic flow in accordance with the vehicle density and the traffic flow rate as shown in FIG. 2 is derived. Here, the derived map, or the like, that represents the condition of a traffic flow in accordance with the vehicle density and the traffic flow rate is recorded in a database of the ECU 2, and is used when S16 in FIG. 3 is performed.

According to the above traffic flow data recording process, a current vehicle density and a current traffic flow rate on the road on which the host vehicle runs are calculated, and the condition of a traffic flow in accordance with the calculated vehicle density and traffic flow rate is derived. Thus, it is possible to acquire a latest traffic flow map, and it is possible to accurately compute the condition of a traffic flow. Particularly, for example, when the shape or number of lanes of a road is changed, it is possible to appropriately compute the condition of a traffic flow.

Figure 5:
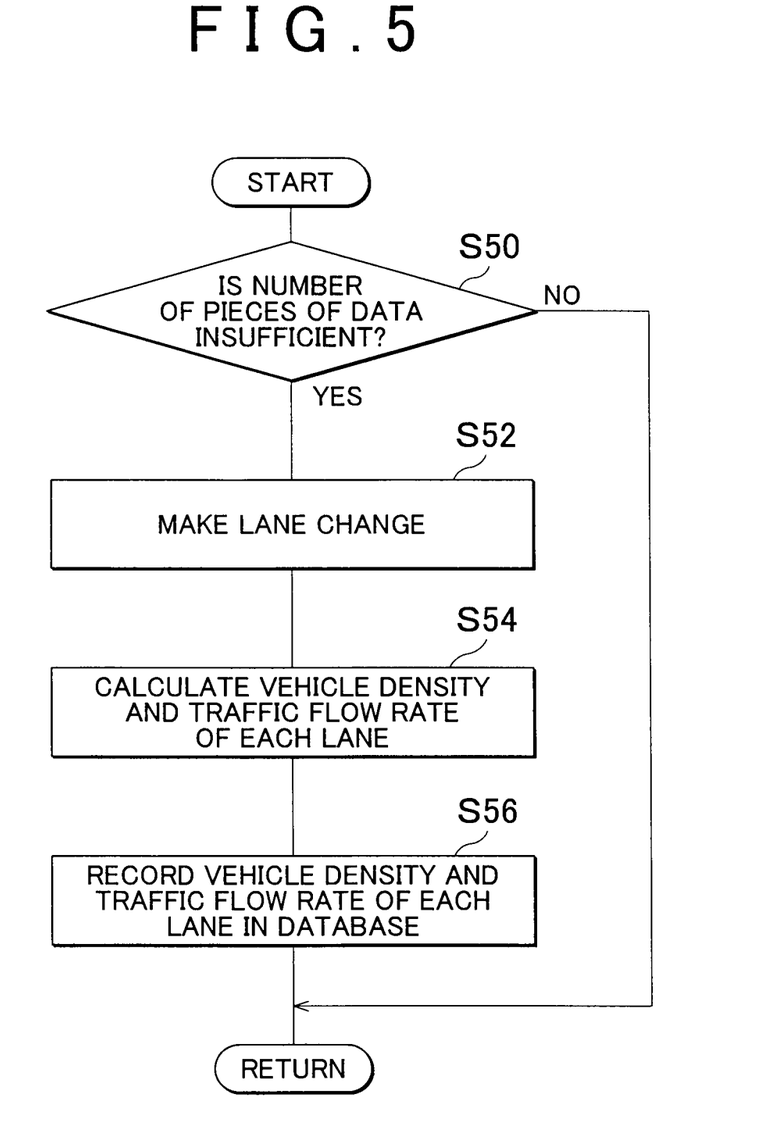
FIG. 5 is a flowchart that shows a data recording process with a lane change, which is executed in the cruise control system shown in FIG. 1.

FIG. 5 is a flowchart that shows a data recording process with a lane change, which is executed in the cruise control system according to the present embodiment.

The data recording process shown in FIG. 5 makes a lane change where necessary, generates a desired vehicle density, calculates a traffic flow rate on a road at that time, detects the condition of a traffic flow to record a traffic map in a database. This process is, for example, repeatedly executed by the ECU 2 at predetermined intervals.

First, in S50 shown in FIG. 5, it is determined whether the number of pieces of recorded data is insufficient. For example, while a host vehicle is running on a road having a plurality of lanes, the number of pieces of data at the vehicle density and the traffic flow rate when the host vehicle does not make a lane change and the number of pieces of data at the vehicle density and the traffic flow rate when the host vehicle makes a lane change are calculated. Then, when the number of pieces of data at the vehicle density and the traffic flow rate with no lane change and the number of pieces of data at the vehicle density and the traffic flow rate with a lane change each are larger than a predetermined number (for example, 100 samples), it is determined that the number of pieces of data is not insufficient. On the other hand, when the number of pieces of data at the vehicle density and the traffic flow rate with no lane change or the number of pieces of data at the vehicle density and the traffic flow rate with a lane change is not larger than a predetermined number, and when the number of pieces of data at the vehicle density and the traffic flow rate with no lane change is larger than the number of pieces of data at the vehicle density and the traffic flow rate with a lane change, it is determined that the number of pieces of data with a lane change is insufficient.

When it is determined in S50 that the number of pieces of data is not insufficient, the control process ends. On the other hand, when it is determined in S50 that the number of pieces of data is insufficient, a lane change process is performed (S52). This lane change process assists driving or controls the vehicle so that the host vehicle makes a lane change. For example, driving instruction may be provided through voice so as to make a lane change or the host vehicle may be caused to make a lane change to an adjacent lane through control intervention.

Then, in S54, a vehicle density and a traffic flow rate after lane change are calculated. This process calculates a current vehicle density and a current traffic flow rate in a lane in which the host vehicle runs after lane change and in a lane other than that. For example, a current vehicle density in each lane is calculated on the basis of detected vehicle information of the host vehicle and vehicle location information acquired through vehicle-to-road communication and inter-vehicle communication, and then a current traffic flow rate on the road is calculated by multiplying the calculated vehicle density by an average vehicle speed. Then, data of these vehicle densities and traffic flow rates are recorded in a database (S56). In addition, it is desirable that the traffic flow, such as a critical density and a quasi-stable condition region, is derived using these vehicle densities and traffic flow rates, and the condition of a traffic flow, including the critical density, is also recorded in a database together with the vehicle densities and the traffic flow rates.

According to the above data recording process, while the host vehicle is running on a road having a plurality of lanes, the host vehicle is caused to make a lane change, a vehicle density and a traffic flow rate after the lane change are acquired, and the critical density on that road is calculated. Thus, it is possible to acquire accurate critical density data of that road. By so doing, the number of pieces of data of the critical density may be increased to thereby make it possible to improve quality of the database.

Figure 6:
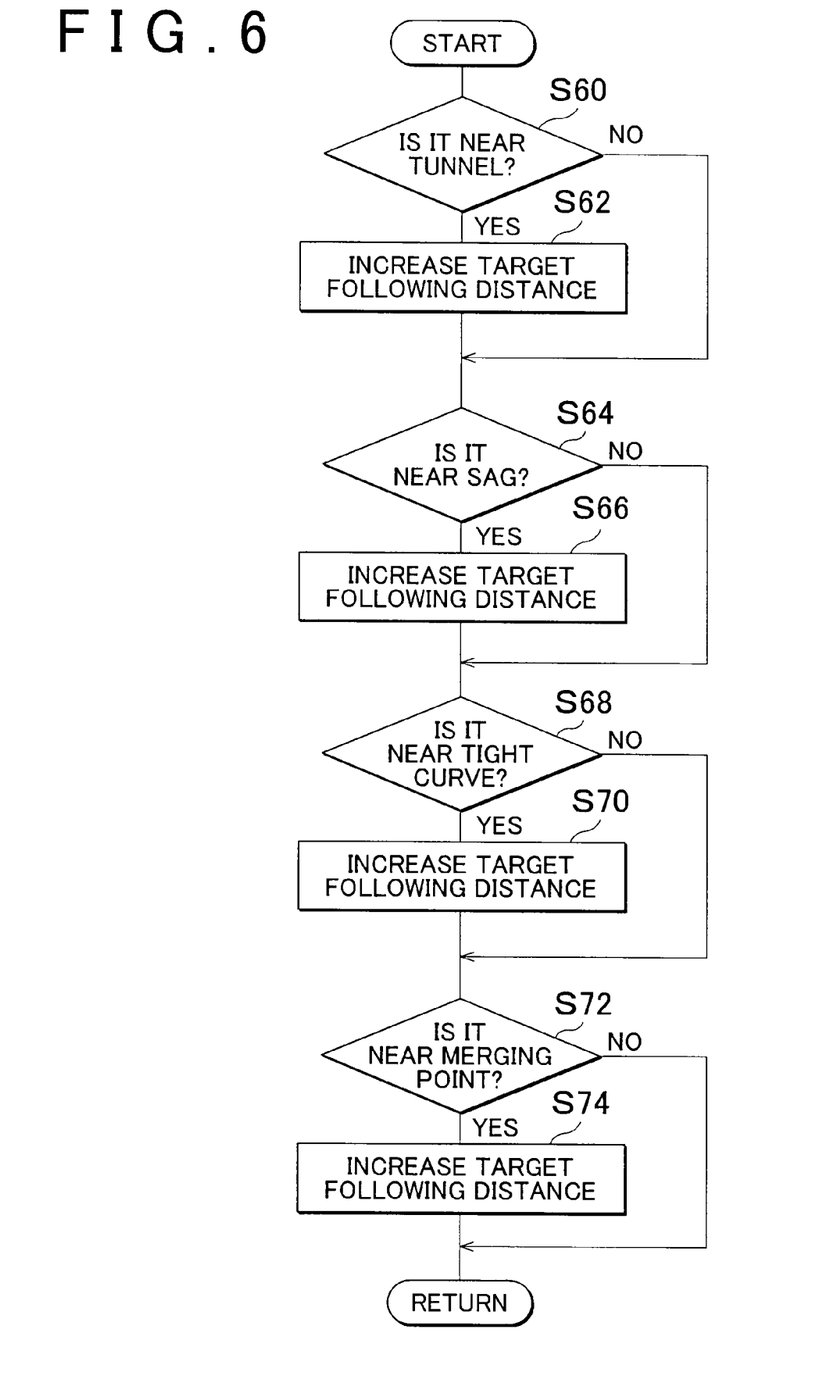
FIG. 6 is a flowchart that shows a target following distance setting process executed in the cruise control system shown in FIG. 1.

FIG. 6 is a flowchart that shows a target following distance setting process executed in the cruise control system according to the present embodiment.

The target following distance setting process shown in FIG. 6 sets a target following distance in tracking control, following distance control, and the like, and increases a target following distance in a running section in which a change (deceleration) in running speed tends to occur or a running section in which a spontaneous traffic congestion tends to occur, such as near a tunnel, a sag, a tight curve, a merging point as compared with at the other points. This process is, for example, repeatedly executed by the ECU 2 at predetermined intervals.

First, in S60 shown in FIG. 6, it is determined whether a running section in which the host vehicle is running is near a tunnel. For example, it is only necessary to determine whether a point at which the host vehicle is running is near a tunnel on the basis of a signal detected by the navigation system 3. In addition, it is desirable that the map data of the navigation system 3 contain in advance information about whether it is near a tunnel. Here, a location near a tunnel means a range from an entrance to the tunnel to a location back at a predetermined distance from the entrance. It is desirable that the predetermined distance is, for example, set to any distance from among 100 to 1000 meters.

When it is determined in S60 that a point at which the host vehicle is running is not near a tunnel, the process proceeds to S64. On the other hand, when it is determined in S60 that a point at which the host vehicle is running is near a tunnel, the target following distance is increased as compared with the target following distance at an ordinary point, that is, at a point at which a spontaneous traffic congestion is less likely to occur (S62). For example, the target following distance is increased by 1.5 times the target following distance at an ordinary point. At this time, it is desirable that the target following distance is set to a distance such that the vehicle density is smaller than or equal to the critical density.

Then, in S64, it is determined whether a point at which the host vehicle is running is near a sag. For example, it is only necessary that it is determined on the basis of a signal detected by the navigation system 3 whether a point at which the host vehicle is running is near a sag (a point at which a road changes from a downhill to a gentle uphill). In addition, it is desirable that the map data of the navigation system 3 contain in advance information about whether it is near a sag. Here, a location near a sag means a range from a location of a sag, at which a road gradient changes, to a location back at a predetermined distance from the location of the sag. It is desirable that the predetermined distance is, for example, set to any distance from among 100 to 1000 meters.

When it is determined in S64 that a point at which the host vehicle is running is not near a sag, the process proceeds to S68. On the other hand, when it is determined in S64 that a point at which the host vehicle is running is near a sag, the target following distance is increased as compared with the target following distance at an ordinary point, that is, at a point at which a spontaneous traffic congestion is less likely to occur (S66). For example, the target following distance is increased by twice the target following distance at an ordinary point. At this time, it is desirable that the target following distance is set to a distance such that the vehicle density is smaller than or equal to the critical density.

Then, in S68, it is determined whether a point at which the host vehicle is running is near a tight curve. For example, it is only necessary to determine whether a point at which the host vehicle is running is near a tight curve on the basis of a signal detected by the navigation system 3. In addition, it is desirable that the map data of the navigation system 3 contain in advance information about whether it is near a tight curve. Here, a location near a tight curve means a range from a location of a tight curve, which requires deceleration, to a location back at a predetermined distance from the location of the tight curve. It is desirably that the predetermined distance is, for example, set to any distance from among 100 to 1000 meters. The tight curve, for example, includes a curve having a radius of curvature of 500 meters or below.

When it is determined in S68 that a point at which the host vehicle is running is not near a tight curve, the process proceeds to S72. On the other hand, when it is determined in S68 that a point at which the host vehicle is running is near a tight curve, the target following distance is increased as compared with the target following distance at an ordinary point, that is, at a point at which a spontaneous traffic congestion is less likely to occur (S70). For example, the target following distance is increased as the radius of curvature of a curve decreases. At this time, it is desirable that the target following distance is set to a distance such that the vehicle density is smaller than or equal to the critical density.

Then, in S72, it is determined whether a point at which the host vehicle is running is near a merging point. For example, it is only necessary to determine whether a point at which the host vehicle is running is near a merging point on the basis of a signal detected by the navigation system 3. In addition, it is desirable that the map data of the navigation system 3 contain in advance information about whether it is near a merging point. Here, a location near a merging point means a range from a location of a merging point of a road to a location back at a predetermined distance from the location of the merging point. It is desirable that the predetermined distance is, for example, set to any distance from among 100 to 1000 meters.

When it is determined in S72 that a point at which the host vehicle is running is not near a merging point, the control process ends. On the other hand, when it is determined in S72 that a point at which the host vehicle is running is near a merging point, the target following distance is increased as compared with the target following distance at an ordinary point, that is, at a point at which a spontaneous traffic congestion is less likely to occur (S74). For example, when the host vehicle is running in a main line that merges with a branch line, the target following distance is increased by 1.5 times the target following distance at an ordinary point. When the host vehicle is running in a main line that merges with another main line, the target following distance is increased by twice the target following distance at an ordinary point. When the host vehicle is running in a branch line that merges with a main line, the target following distance is increased by three times the target following distance at an ordinary point. In these cases, it is desirable that the target following distance is set to a distance such that the vehicle density is smaller than or equal to the critical density. When the process in S74 ends, a series of control process ends.

According to the above target following distance setting process, by relatively increasing a target following distance in a running section, which causes a change in vehicle speed (particularly, a change from acceleration to deceleration), on a road, a following distance is increased in a section in which the vehicle density tends to increase. Thus, it is possible to suppress or prevent occurrence of a traffic congestion.

In addition, by setting the target following distance to a distance such that the vehicle density is smaller than or equal to the critical density, a sufficient following distance is ensured. Thus, it is possible to suppress occurrence of a spontaneous traffic congestion.

Note that in the above described target following distance setting process, when the target following distance is increased as compared with that at an ordinary point in S62, S66, S70 and S74, the critical density may be decreased as compared with that at an ordinary point, and the target following distance may be relatively increased in accordance with the critical density.

In addition, in the above described target following vehicle distance setting process, a portion of the processes in S60 and S62, in S64 and S66, in S68 and S70 and in S72 and S74 may be omitted. In addition, other than these processes, another process may be added to increase the target following distance when the host vehicle is running near a point at which a spontaneous traffic congestion tends to occur.

As described above, with the cruise control system and the cruise control method according to the present embodiment, by performing cruise control so that a following distance has a less tendency to decrease as the vehicle density on the road increases toward the critical density, the following distance is not excessively decreased even when the vehicle density increases and, therefore, it is likely to cause a spontaneous traffic congestion. In addition, a braking operation hardly propagates to a following vehicle. Thus, it is possible to suppress or prevent a congested traffic flow.

In addition, cruise control is performed by setting a target following distance such that the vehicle density is smaller than or equal to the critical density. Thus, even when the vehicle density increases and, therefore, it is likely to cause a spontaneous traffic congestion, it is possible to prevent a following distance from being excessively decreased. Thus, a braking operation of a vehicle hardly propagates to a following vehicle, so it is possible to suppress or prevent a congested traffic flow. In addition, when the traffic flow is a congested traffic flow, the vehicle is driven to keep a following distance so that the vehicle density is smaller than or equal to the critical density. Thus, the vehicle may accelerate immediately in response to acceleration of the vehicle ahead, so it is possible to early eliminate the traffic congestion.

In addition, when the vehicle density is larger than the critical density and, as a result, the traffic condition is a congested traffic flow, by increasing a target following distance as compared with an average following distance in the congested traffic flow, the following distance is relatively increased. Thus, the vehicle may accelerate immediately in response to acceleration of the vehicle ahead, so it is possible to early eliminate the traffic congestion.

In addition, by relatively increasing a target following distance in a running section, which causes a change in vehicle speed, on a road relatively, a following distance is increased in a section in which the vehicle density tends to increase. Thus, it is possible to suppress or prevent occurrence of a traffic congestion.

In addition, while the host vehicle is running on a road having a plurality of lanes, the host vehicle is caused to make a lane change, a vehicle density and a traffic flow rate after the lane change are acquired, and the critical density on that road is calculated. Thus, it is possible to acquire accurate critical density data of that road.

Note that the above embodiment describes an example of the cruise control system and an example of the cruise control method according to the invention, and the cruise control system and the cruise control method according to the invention are not limited to the one described in the present embodiment. The cruise control system and the cruise control method according to the invention may be modified from the cruise control system or the cruise control method according to the embodiment or may be applied to another apparatus or method without departing from the scope of the appended claims.

What is claimed is:

1. A cruise control system comprising:
   a traffic condition acquisition unit that acquires a traffic condition that includes a vehicle density on a road on which a vehicle runs; and
   a cruise control unit that performs cruise control on the vehicle so that a following distance increases as the vehicle density on the road increases toward a critical density.

2. The cruise control system according to claim 1, wherein the cruise control unit controls the following distance to the vehicle ahead, and increases a feedback gain for determining the following distance as the vehicle density increases toward the critical density.

3. The cruise control system according to claim 1, wherein the cruise control unit performs cruise control such that a target following distance is set so that the vehicle density is smaller than or equal to the critical density.

4. The cruise control system according to claim 1, wherein if the vehicle density is larger than the critical density and the traffic condition is a congested traffic flow, the cruise control unit increases a target following distance as compared with an average following distance in the congested traffic flow.

5. The cruise control system according to claim 4, wherein if the vehicle density is larger than the critical density and the traffic condition is a congested traffic flow, the cruise control unit sets the target following distance so that the vehicle density is smaller than or equal to the critical density.

6. The cruise control system according to claim 1, further comprising:
   a road information acquisition unit that acquires information of a running section which causes a change in speed of the vehicle on the road, wherein
   the cruise control unit increases a target following distance in the running section as compared with a target following distance in a section other than the running section.

7. The cruise control system according to claim 6, wherein the cruise control unit sets the target following distance in the running section to a distance such that the vehicle density is smaller than or equal to the critical density.

8. The cruise control system according to claim 6, wherein the road information acquisition unit sets the running section from a point, which is located at a predetermined distance back from a point at which the vehicle decelerates, to the point at which the vehicle decelerates.

9. The cruise control system according to claim 8, wherein the point at which a vehicle decelerates is at least any one of a tunnel, a sag, a tight curve and a merging point.

10. The cruise control system according to claim 1, wherein
    the traffic condition acquisition unit causes a host vehicle to make a lane change when the host vehicle is running on a road having a plurality of lanes, acquires the vehicle density and a traffic flow rate after the lane change, and calculates the critical density on that road.

11. The cruise control system according to claim 1, wherein
    the cruise control unit instructs a driver of the vehicle not to decrease a following distance.

12. The cruise control system according to claim 1, wherein
    the critical density is the vehicle density at which a traffic congestion occurs.

13. The cruise control system according to claim 12, wherein
    the critical density is the vehicle density at which a traffic flow changes from a free traffic flow to a congested traffic flow,
    the free traffic flow is a condition in which a traffic flow rate increases with an increase in the vehicle density, and
    the congested traffic flow is a condition in which the traffic flow rate decreases with an increase in the vehicle density.

14. A cruise control method comprising:
    acquiring a traffic condition that includes a vehicle density on a road on which a vehicle runs; and
    performing cruise control on the vehicle so that a following distance increases as the vehicle density on the road increases toward a critical density.

15. The cruise control method according to claim 14, wherein
    the cruise control controls a following distance to the vehicle ahead, and increases a feedback gain for determining the following distance as the vehicle density increases toward the critical density.

16. The cruise control method according to claim 14, wherein
    a target following distance is set so that the vehicle density is smaller than or equal to the critical density.

17. A cruise control system comprising:
    a traffic condition acquisition unit that acquires a traffic condition on a road on which a vehicle runs; and
    a cruise control unit that performs cruise control on the vehicle so that a following distance increase as a volume of traffic on the road increases.

18. The cruise control system according to claim 3, wherein the critical density is the vehicle density at which a traffic flow changes from a free traffic flow to a congested traffic flow.

19. The cruise control system according to claim 1, wherein the cruise control unit controls the vehicle so that the following distance is increased by a factor of 1.5.

20. The cruise control system according to claim 6, wherein the running section includes a bridge, a sag, a turn or a merging point.

* * * * *